United States Patent [19]

Mele

[11] Patent Number: 5,192,050

[45] Date of Patent: Mar. 9, 1993

[54] FOOT OPERATED WATER VALVE APPARATUS

[76] Inventor: Peter C. Mele, P.O. Box 1596, Burlington, Vt. 05402

[21] Appl. No.: 879,564

[22] Filed: May 7, 1992

[51] Int. Cl.$^5$ ................ F16K 31/122; F16K 31/62
[52] U.S. Cl. ............................. 251/295; 251/57; 251/63
[58] Field of Search ............... 251/57, 63, 293, 295; 137/219

[56] References Cited

U.S. PATENT DOCUMENTS

| | | | |
|---|---|---|---|
| 2,997,851 | 8/1961 | Toubert et al. | 251/57 X |
| 3,536,294 | 10/1970 | Rodriguez | 251/295 X |
| 3,648,968 | 3/1972 | Reid et al. | 251/295 X |
| 3,789,866 | 2/1974 | Combes | 137/219 |
| 4,052,035 | 10/1977 | Kenny et al. | 251/295 X |
| 5,029,806 | 7/1991 | Huo-Lien et al. | 251/295 X |

FOREIGN PATENT DOCUMENTS 77968  11/1918  Switzerland ............ 137/219

Primary Examiner—John Rivell
Attorney, Agent, or Firm—Thomas N. Neiman

[57] ABSTRACT

The foot operated water valve apparatus is adapted for providing control of the flow of water through a water pipe without the necessity for using one's hands to shut off or start water flow. The apparatus comprises a valve in a housing attached to a water pipe fitting. A seal is provided to minimize water leakage of the unit. A fixed center rod is surrounded by a moving outer wall piston which is driven by water pressure differential. A series of small water exhaust holes are positioned at the based of the apparatus. Also, provided are a series of apertures from the piston interior to the flexible tube to the foot valve in order to provide pressurization to the foot pump and the extra pressure necessary to open the valve. The foot pump contains a fluid reservoir that allows for a pressure surge when the pump is stepped upon. This action causes the moving outer wall piston to move upward causing fluid to flow through the main pipe.

2 Claims, 1 Drawing Sheet

FOOT OPERATED WATER VALVE APPARATUS

This invention pertains to water valve apparatus and, in particular, to such water valve apparatus that are controlled by means of foot control valve.

There are many systems on the market that control the flow through water lines in a number of different ways. For example, screw control hose nozzles control water flow by means of manually changing the size of the opening in the nozzle. However, this requires the use of manual control over the valve which can be a problem in certain situations. There have been a number of patents issued in the Foot Control valve field including the U.S. Pat. No. 3,536,294, issued to J. P. Rodriquez for a Foot Operated Control Valve Attachment Device For Water Faucets and the patent issued to R. Trubert, U.S. Pat. No. 2,839,264 for a Foot Actuated Cock. The difficulties that are inherent in these designs and should be overcome include the following: They operate on a principle of a spring return mechanism to overcome pressure in the system. These springs are subject to failure over a period of time and become unreliable and, in addition, take up space. What is needed is a simple device that can be attached simply to a faucet an operates on foot pedal pressure differential with no springs used in the apparatus, so that one can wash the dishes in a sink without having to manually turn the water on an off constantly and is small enough to fit on the existing faucet, because the cock is a piston and fits into the pipe.

It is the object of this invention to teach a Foot Operated Water Valve Apparatus which avoids the disadvantages and limitations, above recited which occur in previous water control valve apparatus. Particularly, it is the object of this invention to teach a foot operated water valve apparatus, for use in situations that require or benefit from the user controlling the flow of water without the use of one's hands, comprising a valve housing; said valve housing having threading means for attaching said housing to a water line fitting; said valve fitting having a circular body; said valve housing further having sealing means positioned at the junction of said valve housing and said water line fitting; centerline rod means; said centerline rod means comprising a fixed rod; said centerline rod having a hollow lower portion; moving piston means surrounding said centerline rod means; said moving piston means having an open base portion; internal aperture means for permitting flow of the fluid when said moving piston means is in the open position; said internal aperture means comprising main line aperture means for directing fluid to the main outlet; pressure control line aperture means; foot valve means; means for connecting said foot valve to said pressure control line aperture means; and said foot valve means having bladder means for providing a fluid reservoir in order to allow a foot induced pressure surge.

Further objects and features of this invention will become more apparent by reference to the following description taken in conjunction with the following figures, in which.

Figure 1:
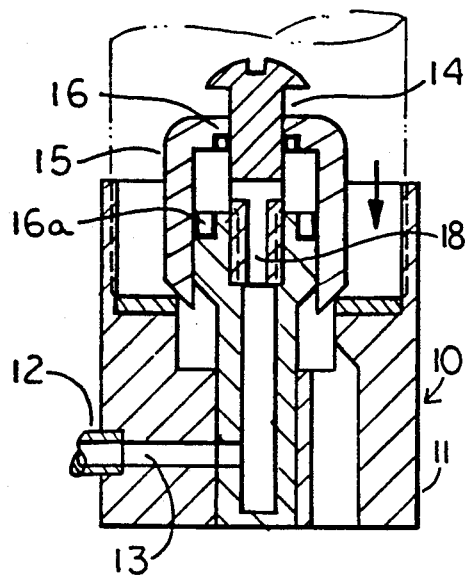
FIG. 1 is an enlarged cross sectional view taken along line 2—2 of FIG. 5 of the novel apparatus in the closed position.

As shown in the figures, the novel apparatus 10 comprises a valve body 11 that has an aperture 13 with a foot valve pressure control line 12 that goes to the fluid bladder 21 (the bladder may be no larger that the line itself, or a wider bladder could be used) in the foot control 20 that has a twist to lock feature. It is necessary to have an air bleed to allow the line to charge with fluid only. The valve body 11 has a centerline rod 14 that is in a fixed position. A moveable outer piston 15 surrounds the rod and moves up and down as controlled by means of water pressure. The lower end of the piston 15 is open to facilitate water flow. Seals 16 and 16a are u cup shaped seals. Seal 16 is designed to provide a fluid bleed when the outer piston is in the closed position to allow for pressure to be present in the foot valve pressure control line 12. The lower end 18 of the centerline rod is hollow. Mainline exhaust ports 17, 17a, 17b, 17c, 17d, 17e and 17f permit water flow out of the main line.

Figure 2:
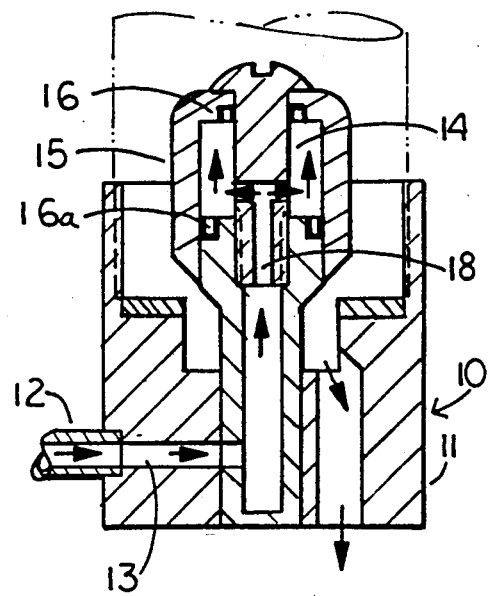
FIG. 2 is an enlarged cross sectional view taken along line 2—2 of FIG. 5 of the novel apparatus in the open position.
Figure 3:
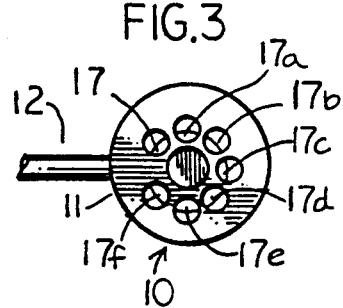
FIG. 3 is an enlarged bottom plan view thereof.
Figure 4:
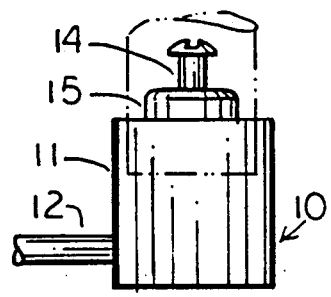
FIG. 4 is an enlarged side elevational view thereof.
Figure 5:
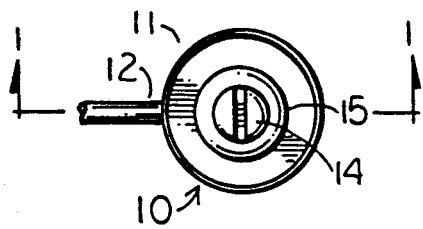
FIG. 5 is an enlarged top plan view thereof.
Figure 6:
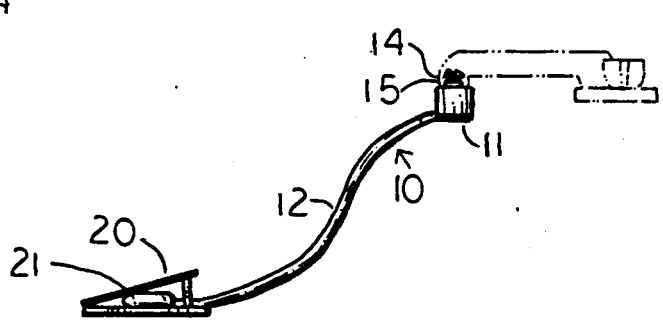
FIG. 6 is a perspective view of the entire apparatus.

In operation, the apparatus is screwed into the water faucet aerator or shower head. The moveable piston is forced by the dynamic water pressure to the closed position (down) thereby shutting the water off in the main outlet stream as shown in FIG. 1. At this point in time, the system is in a pressure balance condition. When the user wishes water to flow through the main line, he or she would step on the foot valve which can be locked open. This action will produce a differential pressure surge which will lift the piston to the open position (upward) and will permit to flow out the main line as shown in FIG. 2. Simply lifting one's foot off of the foot valve will shut down the flow of water.

While I have described my invention in connection with specific embodiments thereof, it is clearly to be understood that this is done only by way of example and not as a limitation to the scope of my invention as set forth in the objects thereof and in the appended claims.

I claim:

1. A foot operated water valve apparatus, for use in situations that require or would benefit from the user controlling the flow of water without the use of one's hands, comprising:

a valve housing;

said valve housing having threading means for attaching said housing to a water line fitting;

said valve housing comprising a circular body;

said valve housing having sealing means positioned at the junction of said valve housing and said water line fitting;

centerline rod means;

said centerline rod means comprising a fixed rod;

said centerline rod means having a hollow lower portion;

moving piston means surrounding said centerline rod means;

said moving piston means having an open base portion;

said moving piston comprising a circular shell;

internal aperture means for permitting flow of fluid when said moving piston means is in the open position;

said internal aperture means comprising main line aperture means for directing fluid to the main outlet;

a pressure control line;

pressure control line aperture means;
said pressure control line aperture means having at least one sealing means positioned within said moving piston means;
said sealing means comprising u-shaped seals;
said u-shaped seal comprising a seal to permit sufficient leakage to allow for the pressurization when said moving piston means is in the closed position;
foot valve means;
means for connecting said foot valve to said pressure control line aperture means;
said foot valve means having bladder means for providing a fluid reservoir in order to allow a foot induced pressure positive differential;
said foot valve means further having bleed means for allowing said pressure control line to charge with fluid only.

2. A foot operated water valve apparatus, according to claim 1, comprising:
said foot valve means comprising a foot pump for squeezing said bladder means.

* * * * *